March 19, 1963 J. F. FEELEY 3,081,470
AUTOMATICALLY OPERABLE RAMP UNIT
Filed Sept. 25, 1959 5 Sheets-Sheet 3
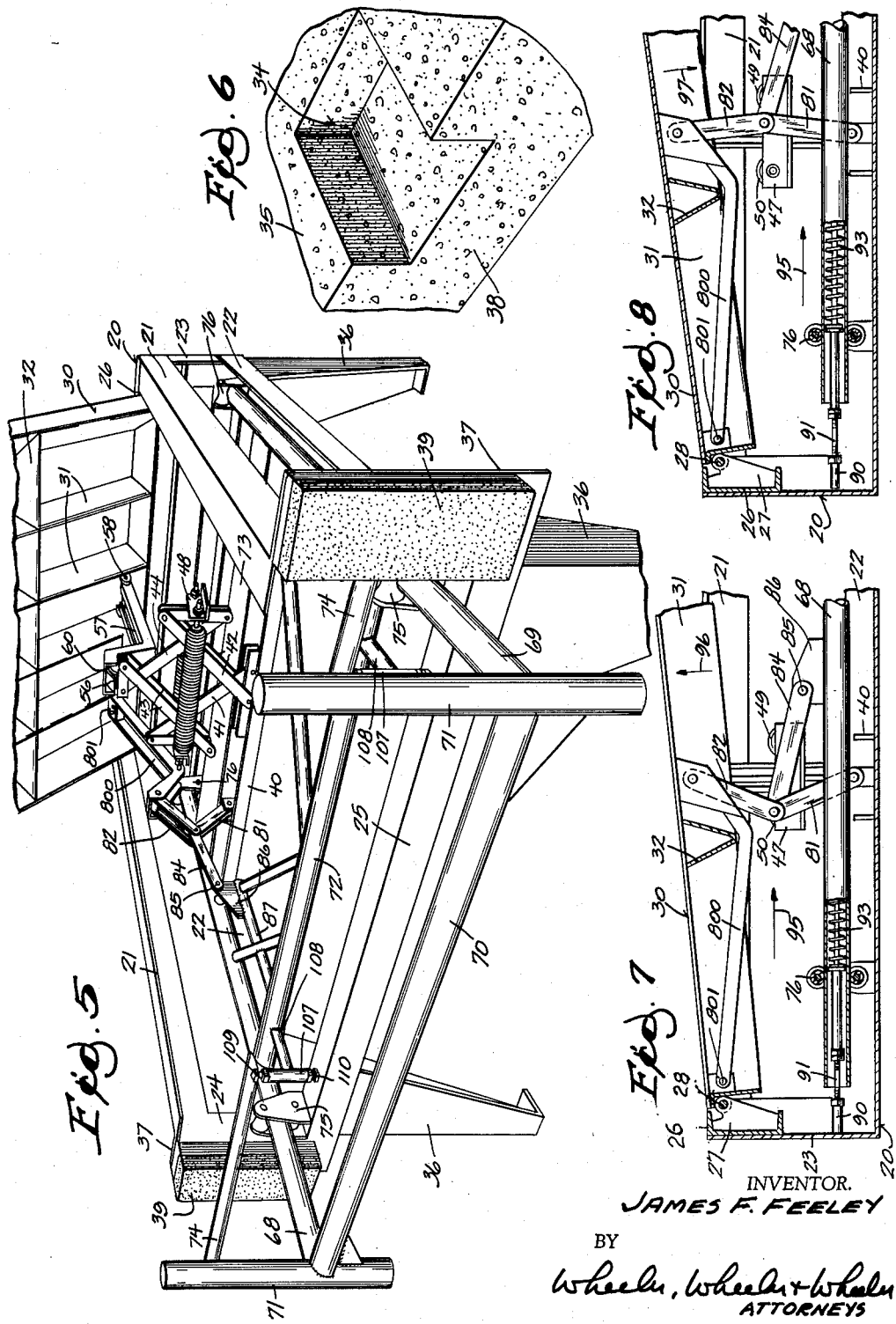
INVENTOR.
JAMES F. FEELEY
BY
Wheeler, Wheeler + Wheeler
ATTORNEYS March 19, 1963 J. F. FEELEY 3,081,470
AUTOMATICALLY OPERABLE RAMP UNIT
Filed Sept. 25, 1959 5 Sheets-Sheet 4
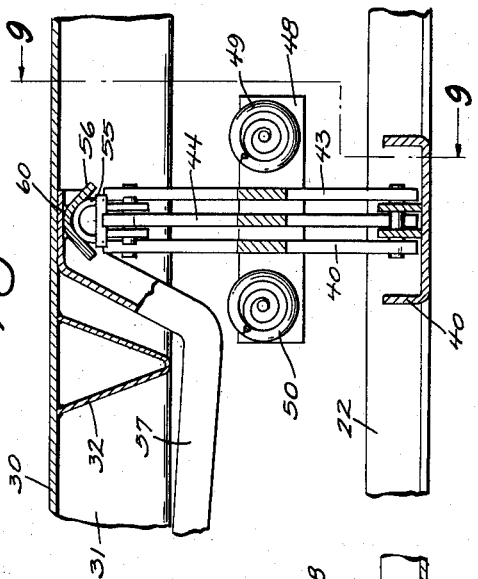
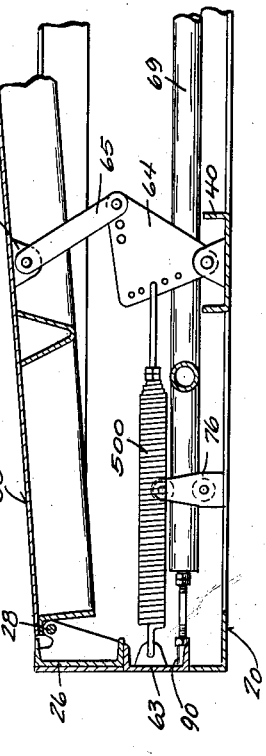
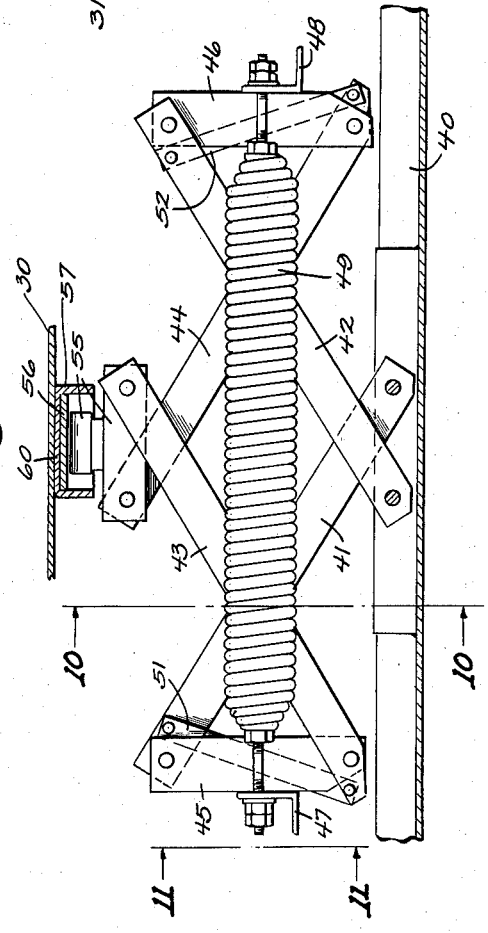
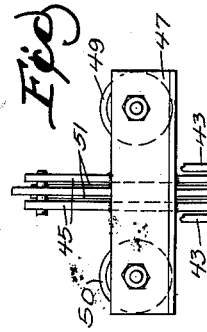
INVENTOR.
JAMES F. FEELEY
BY
Wheeler, Wheeler + Wheeler
ATTORNEYS

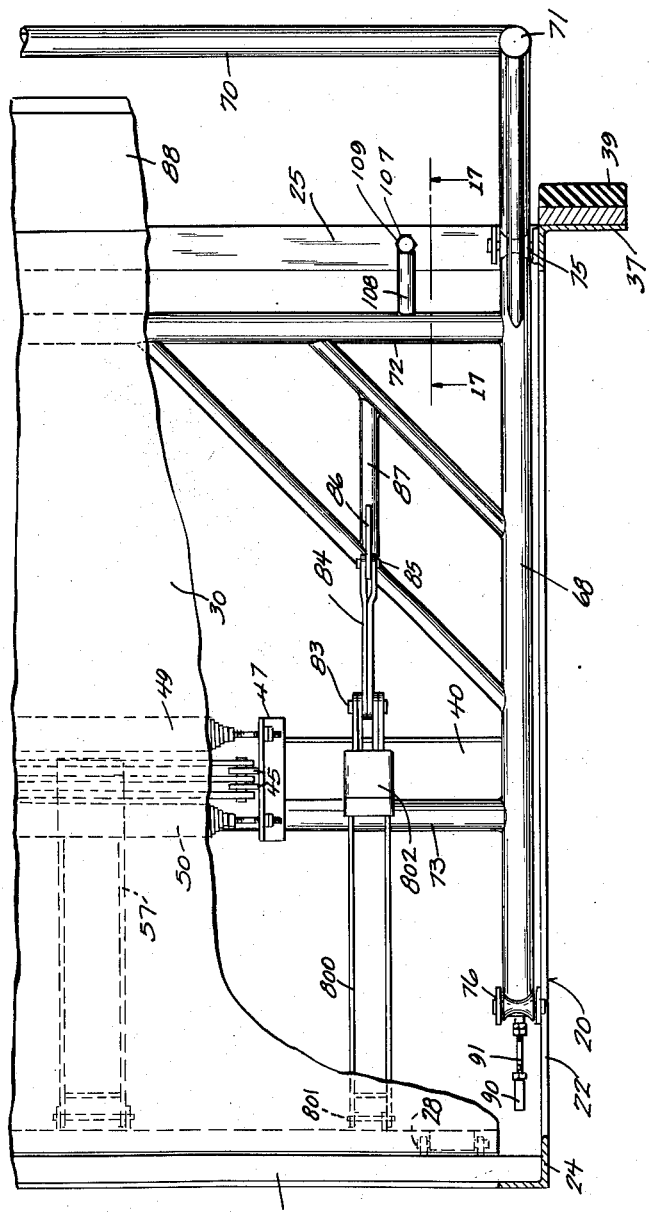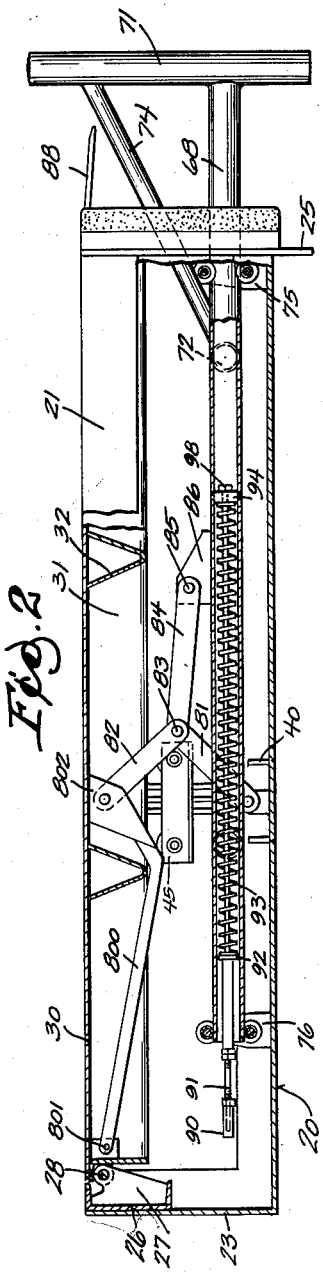
INVENTOR.
JAMES F. FEELEY

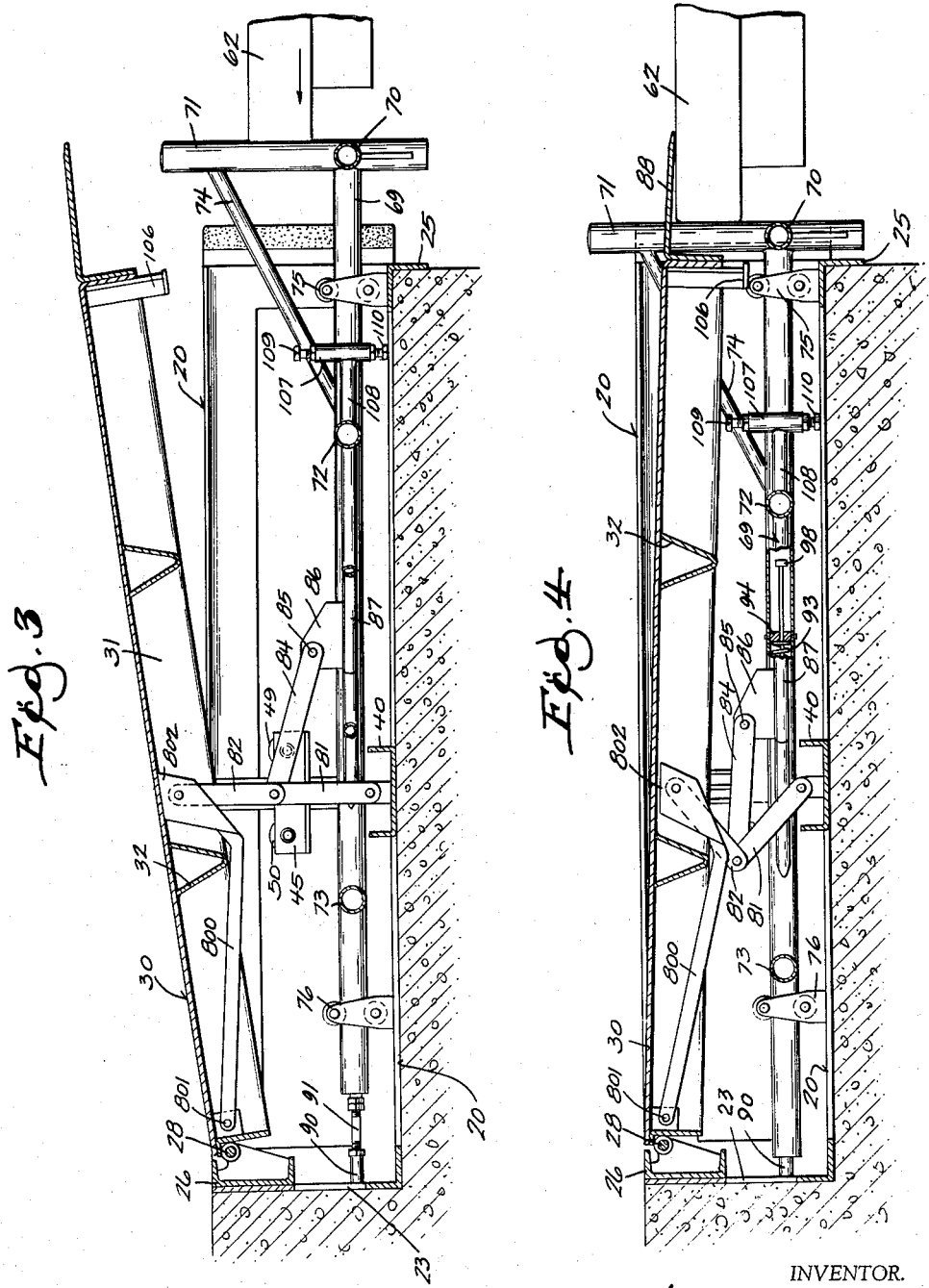

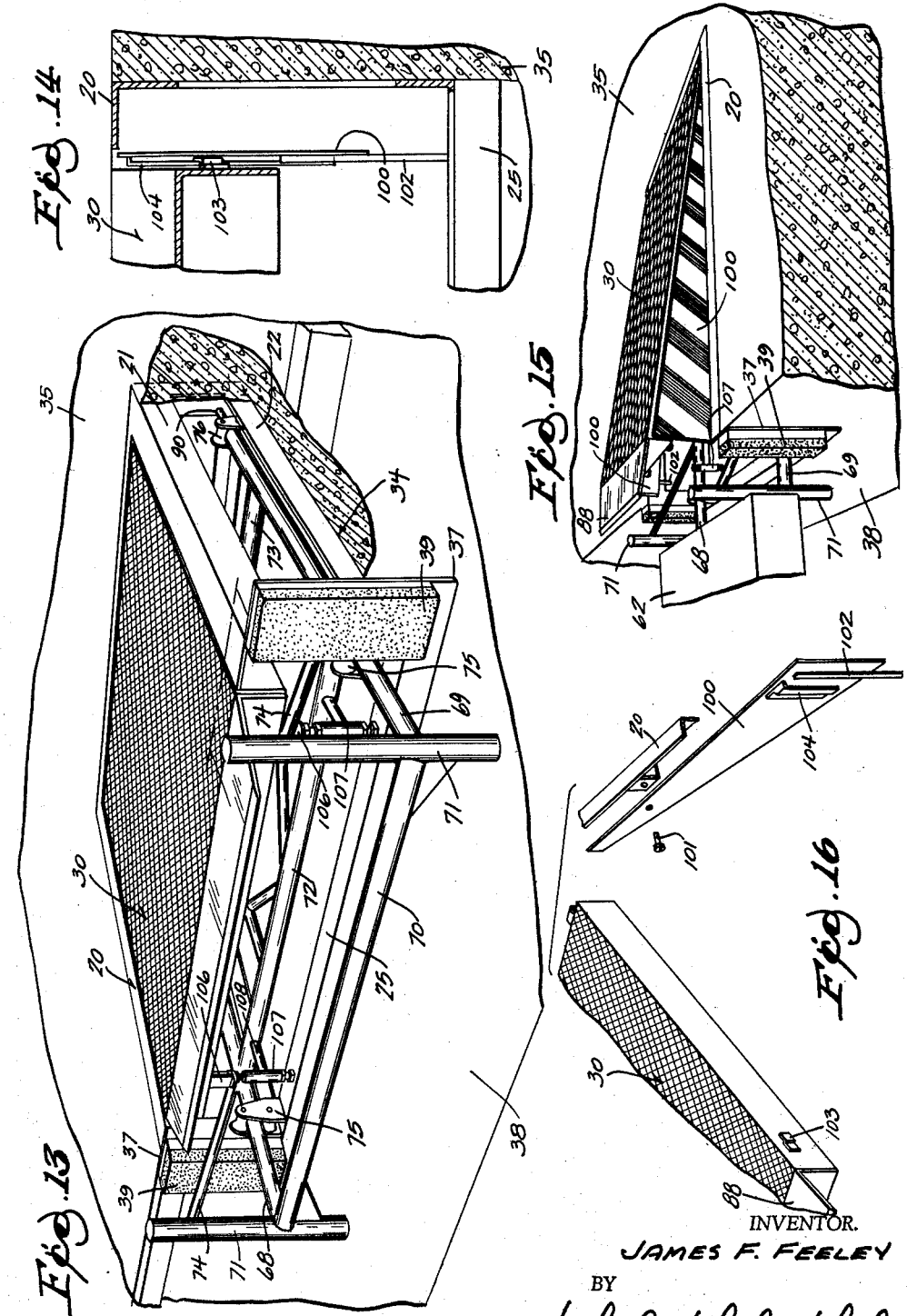

United States Patent Office 3,081,470
Patented Mar. 19, 1963

3,081,470
AUTOMATICALLY OPERABLE RAMP UNIT
James F. Feeley, Milwaukee, Wis., assignor to American Welding and Engineering Company, Inc., Milwaukee, Wis., a corporation of Wisconsin
Filed Sept. 25, 1959, Ser. No. 842,452
8 Claims. (Cl. 14—71)

This invention relates to an automatically operable ramp unit for truck dock installation.

A very important feature of the invention consists in the fact that the unit has its own frame within which it is completely assembled in readiness for installation upon any appropriate surface such as the bottom of a recess formed in the dock. It requires no connection whatever with the structure of the dock.

Its normally horizontal ramp is made to lie flush with the top of the dock to handle traffic on the dock surface when the ramp is not in use. When a truck backs into the dock, it engages push arms which project from the face of the dock and which, as they are forced rearwardly, will first elevate the ramp to make sure that the truck bed will pass beneath it and will then lower the ramp to a level from which the ramp will descend by gravity under the control of its own shock absorbing or counterbalancing spring until it rests on the truck bed.

The rearward movement of the truck push arms deprives of support the cross traffic legs with which the ramp is provided so that the ramp can descend pivotally below dock level in the event that the truck bed is low. Yet, under normal conditions of non-use, the supports on the truck push arms will be disposed beneath the cross traffic legs of the ramp to provide secure support for holding the ramp flush with the surface of the dock.

The rearward movement of the push arms under thrust of the backing truck cocks springs which serve to return the push arms to their original positions as the truck withdraws from the dock. In the return of the push arms to normal position, the elevator toggles go through a cycle of movement which first elevates the ramp free of the truck bed and then permits it to be lowered to its original position flush with the dock.

Toe guard means is provided between the unit frame and the ramp to be automatically elevated in the event that any gap develops between the ramp and the frame, this being a safety measure to exclude toes of personnel from this gap. As the ramp is lowered into a position for use, the guard disappears within the frame, lost motion being provided so that the ramp may continue its downward movement after the guard reaches a position of storage.

The shock absorber or counter-balancing device may comprise either a transverse lazy tongs arrangement having springs which will nearly, but not quite, support the ramp, or a substitute bell crank arrangement with springs connected to the back of the unit frame for the same objective.

The ramp itself is preferably reinforced by V-shaped girders and V-shaped transverse gussets with a checkered plate deck.

Among other advantages, the shipping weight is low, as the total height in practice is only 17½ inches and the apparatus is pre-assembled, the bias of all springs being engineered in advance and no counter-weight being required. The cost installed is ordinarily less than half of that of any comparable unit, particularly in view of the very shallow recess in which it may be mounted with no connection to the dock.

In the drawings:

FIG. 1 is a fragmentary view in plan of a device embodying the invention, portions of the ramp being broken away.

FIG. 2 is a view showing the device in longitudinal section, portions of the push arm being shown in side elevation and portions of the shock absorber being omitted.

FIG. 3 is a view similar to FIG. 2 showing the structure installed and in the relative positions which the parts assume as a low-bed truck backs into a dock.

FIG. 4 is a view similar to FIG. 3 showing the parts in the positions which they assume when the truck is in place and the ramp has been lowered for use.

FIG. 5 is a view in three-quarter perspective showing the mechanism with the ramp raised beyond its normal position to expose the operating mechanism within the unit frame, the frame being provided in a manner which is optional, with legs whereby it may be supported independently of mounting in the normal shallow recess.

FIG. 6 is a view on a reduced scale fragmentarily illustrating in perspective a portion of a dock having a plurality of recesses for reception of devices embodying this invention.

FIG. 7 is a fragmentary detail view similar to a portion of FIG. 4 and showing the parts in the position which they assume as the truck withdraws from the dock.

FIG. 8 is a view similar to FIG. 7 showing the positions of the parts in the course of their continued movement from the position of FIG. 4 beyond the position of FIG. 7 toward the position of FIG. 2.

FIG. 9 is an enlarged fragmentary detail view taken in section transversely of the dock in the plane indicated at 9—9 in FIG. 10.

FIG. 10 is a view taken in section on the line 10—10 of FIG. 9.

FIG. 11 is a view taken from the standpoint of the line 11—11 in FIG. 9.

FIG. 12 is a fragmentary detail view substantially in the scale of FIG. 2 showing a modified shock absorber or counter-balancing arrangement for the ramp.

FIG. 13 is a detail view in perspective showing the apparatus as installed in a shallow recess of a dock as viewed from the front of the dock.

FIG. 14 is an enlarged fragmentary detail view through the unit frame and a portion of the depressed ramp as viewed in the plane indicated at 14—14 in FIG. 13.

FIG. 15 is a detail view fragmentarily illustrating a portion of a dock in perspective, the ramp being shown in an elevated position with the gap between it and the unit frame closed by a toe guard provided in accordance with the invention.

FIG. 16 is a fragmentary exploded detail view in perspective showing the side portion of the ramp and the toe guard operation connections thereof, the toe guard and its pivot bolt being separately illustrated.

FIG. 17 is a view taken in section on line 17—17 of FIG. 1.

The average dock is 48 inches high, and the average automatic ramp unit requires a recess substantially, if not entirely, equal in height to the dock. The present invention contemplates a unitary frame 20 which is preferably made as best shown in FIG. 5 to comprise upper and lower side angles 21 and 22 at each side of the frame connected at the front and rear by vertical angles 23 and 24. These are cross connected at the front by a bottom angle 25 and are cross connected at the rear by heavy channel 26 within which gussets at 27 support the pintles 28 to which the ramp 30 is pivoted. The ramp 30 is heavily reinforced as by longitudinal girders 31 of V-shaped cross section and similarly shaped transverse gussets 32.

The ramp is perfectly free for oscillatory movement about its pintle 28 beyond its normal range of operating adjustment. It has no positive connection with its counterbalancing means or its actuating means as hereinafter described. The unit frame is made very shallow to be received into a shallow recess 34 in a dock 35, the recessed dock being fragmentarily illustrated in FIG. 6. The frame may, however, be provided with legs 36 as shown in FIG. 5, the use of such legs being an optional means of mounting the unitized frame in a deeper recess or, alternatively, supporting it as a free standing frame when no dock is otherwise available.

The frame has lateral wings at 37 at its front end which overlie the forward face 38 of the dock to support cushions 39 to receive the impact of a backing truck.

The shock absorbing and counter-balancing means will now be described.

Spanning an intermediate portion of the unit frame 20 from one of its bottom angles 22 to the other is a transverse channel 40 to which are pivoted links 41 and 42 of a lazy tongs or pantograph device which further comprises links 43 and 44 and connecting links 45 and 46. The cross angles 47, 48 on the connecting links serve as anchorages to which the ends of power tension springs 49 and 50 are adjustably connected. The bias of these springs tends to force upwardly the thrust member 55 to which the links 43, 44 are pivoted at their upper ends. The thrust member 55 is received into a saddle 56 at the free end of angled lever 57 pivoted at the back end of the organization. For convenience, the lever 57 is here shown as being pivoted by means of pintle 58 to the ramp 30 itself. The angle in the lever is to enable it to clear the reinforcing strut 32 (see FIG. 10). At its free end the lever has a pad 60 which bears loosely against the under side of the ramp 30 to exert thereon an upward bias developed by the springs 49 and 50 whenever the weight of the ramp is imposed on such pad. As shown in FIG. 5, the ramp may be lifted free of the pad. As will be noted later, in connection with a discussion of FIG. 4, the pad may also be withdrawn from beneath the ramp when the ramp is supported on the truck bed 62.

In order to keep the lazy tongs or pantograph linkage properly centered, stabilizing links 51 and 52 are desirably connected pivotally between link 43 and link 41 and between link 44 and link 42, as best shown in FIG. 9.

The bias of the springs 49 and 50 should be sufficient to relieve the parts of stress when the ramp is descending under its weight. The bias should also be adequate to support at least a major part of the weight of the ramp to minimize the stress on the operating mechanism.

As an alternative counter-balancing arrangement, the structure shown in FIG. 12 will be used. Here the spring 500 is connected to a reinforcing channel 63 at the rear of the unit frame and acts adjustably through a bell crank 64 which has a link connection 65 to the ramp. In this construction, the spring actuated shock absorbing and counter-balancing means is not free of the ramp, but is in permanent connection therewith, the link 65 being pivotally connected with ears 66 welded to the under side of the ramp. Whichever shock absorbing and counter-balancing device is used, the ramp will have a major portion of its weight supported thereby, whereby the ramp may readily be raised and lowered through energy provided by a truck backing into the dock.

The raising and lowering mechanism will now be described.

A push frame comprises push arms 68 and 69 cross connected in front of the dock by bar 70 as best illustrated in FIG. 5. There are uprights 71 at the ends of the respective arms. The push arms 68, 69 are further connected by cross members 72, 73. The uprights 71 are braced from the push arms by diagonal braces 74. Other bracing connects the cross member 72 with the respective arms 68, 69 as shown.

The push arms 68, 69 are guided for reciprocation in forward and rearward direction in forward and rearward pairs of roller guides 75 and 76 mounted on frame 20.

An elevator is provided for lifting the free forward end portion of the ramp in the course of initial rearward movement of the push frame and then permitting the free end portion of the ramp to be lowered during the continued rearward movement of the push frame. This elevator mechanism may be duplicated at both of the rearwardly movable push arms which are cross connected to constitute the push frame, but because of the fact that most of the weight of the ramp is counter-balanced, a single elevator means operable from one of the push arms is all that is required. While a variety of elevator means is usable to achieve the motion above described, the preferred arrangement is one which employs as an elevator, a set of toggle links comprising a link 81 pivoted to the transverse channel 40 of the unit frame, and a link 82 pivoted to the free end of an angled lever 800 which, like the angled lever 57 of the counter-balancing device is pivoted at 801 near the rear of the frame and has a pad 802 at its forward end portion which bears against the under side of the ramp 30 without being in physical connection thereto. Where these links are pivoted to each other by means of pintle 83, there is pivotally connected to them another link 84 which has another pivotal connection at 85 to the web 86 is mounted on the bracing member 87 of the push frame.

When the ramp is in its normal horizontal position as shown in FIG. 1 and FIG. 2, ramp 30 will be flush with the dock as also shown in FIG. 13, and the uprights 71 of the push frame will be disposed outwardly of the dock to receive the thrust of a truck backing toward the dock. As the truck bed approaches the dock in engagement with the posts 71 of the push frame, the push frame will be moved rearwardly on its roller guides 75, 76, thus straightening the toggle links 81, 82 as shown in FIG. 3 and thereby elevating the ramp 30 to make sure that its projecting lip 88 will clear the truck bed 62.

Just before the parts reach the position of FIG. 3, the adjustable recoil finger 90 projecting from the end of the push arm 68, 69 will engage the angle 23 at the rear corner of the unit frame 20. The finger 90 is adjustably mounted at the end of rod 91, which extends axially through the push arms 68 having a spring thrust collar at 92 engaging the compression spring 93 confined within the arm. The arm has a fixed anchorage at 94 for the remote end of the spring. The recoil spring stores energy as the thrust of the truck on the push frame forces the rods 91 into the push arm to compress the spring.

Continued rearward movement of the truck beyond the position of FIG. 3 forces the toggle levers 81, 82 to collapse rearwardly to the position shown in FIG. 4, forcing the finger 90 into the push arm 68 and highly compressing the recoil spring 93.

In this position of the parts, the collapse of the toggle levers has withdrawn supporting pad 802 from contact with the ramp 30. The ramp will have followed downwardly with the pad 802 by reason of the fact that its weight exceeds the counter-balancing capacity of the shock absorbing springs 49 and 50. However, whenever the free margin or lip portion 88 of the ramp receives support from the bed of the truck, at whatever height such bed is located, the ramp will come to rest. FIG. 4 shows a low bed truck such that the ramp 30 has descended below the top level of its unit frame 20.

When the truck withdraws, the recoil spring will expand to return the push frame forwardly as shown by the arrow 95 in FIG. 7. This will straighten the toggle to effect a momentary upward movement of the ramp as indicated by the arrow 96. Such movement is occasioned by the straightening of the toggle links 81, 82 from the position of FIG. 4. This lifts the ramp free of the truck, at the same time restoring the push frame and toggle links to normal position.

At the position shown in FIG. 8, the toggle links 81 and 82 have passed their position of alignment, and the push frame is now being pushed forwardly by the weight of the ramp itself as exerted through the toggle linkage and through the connecting links 84 and the push frame.

The descending movement of the ramp at this point is shown by the arrow 97. A slight clearance is illustrated between the finger 90 and the abutment at the rear of the unit frame 20, this indicating that the recoil spring 93 is now fully expanded to its normal inoperative position. Further expansion is precluded by engagement with spring seat 94 of the nut 98 at the end of rod 91.

Because the toggle linkage may move the ramp angularly to a point such as to establish an opening between it and the unit frame 20, as shown in FIG. 3, a toe guard is desirably provided to prevent personnel from having their toes trapped in this opening. There is a toe guard at each side of the ramp. This comprises a plate 100 striped to attract attention. It may conveniently be pivoted at 101 to the side of the frame. It has legs 102 at its forward ends. These legs rest against the bottom of the unit frame (or dock recess) to support the toe guard, if desired, when the ramp goes below the level of the unit frame as is shown in FIG. 4 and FIG. 14.

A clip 103 attached to the unit frame engages a slotted guide 104 in the guard plate 100 to provide lost motion to accommodate the downward pivotal movement of the dock below the position in which the guard plate 100 is stationary. In the upward movement of the ramp, the clip 103 reaches the end of the slot in member 104 to lift the guard plate with the dock to the maximum elevation of the dock as shown in FIG. 15.

It is desired that the ramp be supported rigidly when not in use in a horizontal position at a level such as to form a part of the surface of the dock with which it is ordinarily used. At the same time, the means of support employed must be such that the free end of the ramp can descend to a level lower than that of the dock when the bed of the actuating truck is lower than dock level. To accomplish these results the free end of the ramp, immediately behind the lip 88, is provided with legs 106 (FIGS. 3, 4, 13 and 17) and retractable supports 107 for such legs. These supports are connected by arms 108 with the cross member 72 of the push frame 70 and are provided at top and bottom with adjustable extension bolts 109 and 110, respectively, which may be locked in adjustment by the lock nuts illustrated.

The arrangement is such that when the push frame is in the normal forward position which it occupies when the ramp is not in use for truck loading purposes (this position being shown in FIGS. 2 and 13), the lower extension bolt 110 will rest on the bottom front angle 25 of the unit frame 20. This angle rests directly on the bottom front surface 38 of the dock. It is, therefore, able to withstand considerable thrust in downward or rearward directions and it provides a very stable base for the support member 107.

The extension bolt 109 at the top of each support member 107 is so adjusted that when the respective leg 106 of the ramp 30 is engaged therewith, the ramp will be flush with the top surface of the dock 35. Thus any load imposed on the ramp under these conditions is transmitted directly to the dock structure at the bottom of the recess. The ramp is thereby enabled to handle any loads of the order of those commonly handled on the surface of the dock.

However, when a truck engages the push frame 70 to move it rearwardly to raise the ramp as shown in FIG. 3 and ultimately to permit it to come down by gravity into engagement with the truck bed as shown in FIG. 4, the rearward movement of the push frame withdraws the supports 107 from registry with the ramp legs 106 so that, in the lowered position of the ramp 30, as shown in FIG. 4, the supports 107 are far behind the legs and do not interfere with the descent of the ramp.

As the truck is withdrawn, the compression springs housed within the tubular arms 68 and 69 of the push frame restore the push frame to the position in which it is illustrated in FIGS. 2 and 13 so that, in the final descent of the ramp to the horizontal position in which it is illustrated in such figures, the supports 107 are relocated beneath the legs 106 to receive the weight of the free end of the ramp and any burden imposed thereon.

It is to be observed that the cushions 39 are so carried on the wings 37 of the unit frame 20 as to lie against the front face 38 of the dock (FIGS. 13 and 15) thereby transmitting to the dock the shock of any blow imparted thereto by the rear end of a truck bed backing into the dock. Thus, although there is no required connection of the unit frame 20 to the dock, the apparatus of the present invention is not subjected to any stress tending either to deform its frame or to displace it from its position in the recess. It may, however, be bolted into place if desired.

Notwithstanding that the entire unitary assembly can be placed in a recess less than 18 inches deep, the free end of the ramp is capable of movement 16 inches above horizontal and 10 inches below horizontal in practical devices embodying the invention. This makes the unit widely adaptable for use with any conventional truck to provide easy and smooth access to the truck bed whether the level of such bed is above or below that of the dock. Yet, when the ramp is not in use for loading or unloading, it handles cross traffic along the dock with the same facility as if the dock surface were continuous. In practice, the ramp is engineered to carry 20,000 pounds in any position of use.

The guide rollers upon which the push frame arms are supported for reciprocation are an important feature in that the push frame never cramps or bends whether the truck thrust thereon is at right angles to the dock or oblique thereto.

Most of the advantages of the device are also available when used as a free standing unit independently of any dock. As above explained, the legs 36 are supplied to adapt the unit for such use.

I claim:

1. As a new article of manufacture, an automatically operable ramp assembly adapted for unitary handling and receivable unitarily into a shallow dock recess, said assembly comprising a self-supporting prefabricated main frame having bottommost frame supports adapted to rest on the floor of said recess, a ramp having pivotal connection with said main frame at the rear thereof and having a free forward end portion movable about said pivotal connection to positions both above and below the level of the top of the main frame, and a reciprocating subframe within said main frame having push arm means projecting forwardly of the main frame, ramp actuating means between said subframe and ramp and recoil spring means between the subframe and the main frame biasing said subframe to its foremost position, said recoil spring means and ramp actuating means being wholly above the level of said main frame supports to function within the confines of the said dock recess, said unit further including guard plates connected with the sides of the frame to be elevated with the ramp for closing any lateral gap between the ramp and the main frame when the ramp is elevated, said plates having lost motion connection with the ramp and having means for limiting their downward movement substantially to the level of the top of the main frame when the ramp has its free end portion below said level.

2. An automatic loading ramp assembly for trucks and adapted to raise the ramp and lower it onto the bed of a backing truck, said assembly comprising the combination with a main frame, of a ramp having a rear end portion in pivotal connection with the main frame, the front end portion of the ramp being free for pivotal movement respecting the main frame, and means whereby a truck bed approaching said frame will provide motion and control both for the initial raising and ultimate lowering of the free end of the ramp in the course of unidirectional motion of said means, said means including a push arm reciprocable respecting the main frame and normally projecting beyond the free end portion of the ramp, an elevator beneath the movable portion of the ramp and in lifting relation therewith and means for transmitting motion from said push arm to said elevator for first raising said elevator and subsequently lowering said elevator in the continued rearward movement of the push arm under thrust of a truck bed backing toward said main frame, the elevator comprising a pair of toggle links in pivotal connection with each other, the lower of said links and the upper of said links having pivotal connections respectively with the main frame and ramp normally disposed on a line offset from the pivotal connection of said links with each other and said push arm having a connection with said links substantially at their pivotal connection with each other, the rearward movement of the push arm moving the pivotal connection of said links with each other past said line whereby said links are first straightened and then moved to an angle opposite their original angle, said toggle links having relatively small mechanical advantage in the initial movement of the push arm and relatively great mechanical advantage thereafter.

3. The device of claim 2 in which the push arm is provided with spring means and a spring stop against which the spring means is compressed during a portion of the rearward movement of said arm, said spring means being adapted to expand upon withdrawal of pressure from said arm for restoring said arms and links toward their original positions, and lost motion abutment means between said spring means and spring stop whereby the spring will offer no resistance to initial movement of the push arm when said toggle links have relatively small mechanical advantage.

4. The device of claim 2 in which said ramp is provided with counter-balancing means sustaining less than all of the weight of the ramp, whereby the ramp will follow said elevator means in the downward movement thereof, said counter-balancing means comprising a spring and a spring force transmitting linkage coupling the spring to the ramp.

5. In an automatic ramp installation, the combination of a main frame and a push-frame reciprocable in the main frame, said main frame being provided with paired sets of anti-friction guides disposed fore and aft, said push-frame comprising side arms reciprocable in said guides and projecting forwardly from the main frame, a ramp having a pivotal connection at its rear end with the main frame, the front end of the ramp being free for upward and downward movement with respect to a normal horizontal position of the ramp, a counter-balancing spring and spring force transmitting linkage coupling the spring to the ramp and opposing the weight of the free front end portion of the ramp, and an over-center toggle elevator free of positive connection with the ramp but having a lost motion guide connection thereto and means connecting said elevator toggle with said push frame for the over center operation of said toggle in the course of the reciprocation of said push frame respecting the main frame.

6. The device of claim 5 in which the push frame arms comprise hollow tubes, at least one of said tubes having therewithin a spring biasing the push frame toward a position of normal projection from the main frame and adapted to restore the push frame and elevator toggle to initial position following displacement of the push arm rearwardly in opposition to said bias.

7. A loading ramp assembly comprising the combination with a frame, of a ramp pivoted near the rear of the frame and having a free end portion movable between a normal position level with the frame and a second position in which the free end portion is above the frame and a third position in which the free end portion is below the frame, and guard means laterally adjacent the ramp comprising plates having in a lowermost position thereof their upper margins normally flush with the frame and extending below frame level to close any gap between the top of the frame and the free end portion of the ramp in the third position of the ramp, means supporting the plates in their said lowermost position, and a lost motion connection between the ramp and the plates to uncouple the ramp and plates when the ramp descends to its third position and to couple the ramp and plates when the ramp moves to its second position whereby the plates are lifted with the ramp.

8. The combination in an adjustable ramp assembly including a pivoted ramp and elevator means for lifting the ramp, of counter-balance means to relieve said elevator means of most of the weight of the ramp and comprising lazy tong links and a spring biasing the lazy tong links into upward thrust engagement with the ramp.

References Cited in the file of this patent

UNITED STATES PATENTS

| 2,751,615 | Kelley | June 26, 1956 |
| 2,994,894 | Loomis | Aug. 8, 1961 |

FOREIGN PATENTS

| 26,868 | Finland | Oct. 10, 1954 |

OTHER REFERENCES

Flow, pub. May 1956, page 16.